US006767055B1

(12) United States Patent
Sparks (10) Patent No.: US 6,767,055 B1
(45) Date of Patent: Jul. 27, 2004

(54) VEHICLE SEAT FRAME AND BELT ASSEMBLY

(75) Inventor: C. Michael Sparks, Piedmont, AL (US)

(73) Assignee: Bostrom Seating, Inc., Piedmont, AL (US)

( * ) Notice: Subject to any disclaimer, the term of this patent is extended or adjusted under 35 U.S.C. 154(b) by 0 days.

(21) Appl. No.: 10/374,952

(22) Filed: Feb. 25, 2003

Related U.S. Application Data (60) Provisional application No. 60/363,692, filed on Mar. 11, 2002.

(51) Int. Cl.[7] .............................. B60N 2/42; B60R 21/00
(52) U.S. Cl. ............................. 297/216.14; 297/216.13; 297/252.2
(58) Field of Search ....................... 297/216.13, 216.14, 297/470, 452.18, 452.2, 250.1, 256.13, 354.1

(56) References Cited

U.S. PATENT DOCUMENTS

| | | | | |
|---|---|---|---|---|
| 2,018,825 A | | 10/1935 | Wood ........................ | 155/164 |
| 2,736,365 A | * | 2/1956 | Hines ....................... | 297/183.5 |
| 2,855,986 A | * | 10/1958 | Engelen .................... | 297/382 |
| 3,638,999 A | | 2/1972 | Tischler ..................... | 297/379 |
| 3,761,127 A | | 9/1973 | Giese et al. ................ | 297/389 |
| 4,435,012 A | | 3/1984 | Kassai ........................ | 297/355 |
| 4,568,106 A | | 2/1986 | Yokoyama ................. | 280/807 |
| 4,718,696 A | | 1/1988 | Koide et al. ................ | 280/801 |
| 4,804,226 A | | 2/1989 | Schmale .................... | 297/216 |
| 4,834,411 A | | 5/1989 | Willey et al. ............... | 280/250 |
| 4,848,787 A | | 7/1989 | Kassai ........................ | 280/642 |
| 5,000,283 A | | 3/1991 | Krieg ......................... | 180/271 |
| 5,137,295 A | | 8/1992 | Peek .......................... | 280/304.1 |
| 5,145,197 A | | 9/1992 | Gatti .......................... | 280/304.1 |
| 5,246,271 A | | 9/1993 | Boisset ...................... | 297/362.13 |
| 5,261,696 A | | 11/1993 | Hamaue ..................... | 280/802 |
| 5,318,341 A | | 6/1994 | Griswold et al. .......... | 297/362.11 |

(List continued on next page.)

FOREIGN PATENT DOCUMENTS

| | | | | |
|---|---|---|---|---|
| DE | 4233944 A1 | * | 4/1994 | ............ B60N/2/00 |
| EP | 154427 A2 | * | 9/1985 | ............ B60N/1/12 |

OTHER PUBLICATIONS

49 CFR §571.207, Seating systems, Nat'l Highway Traffic Safety Admin., Dot, 49 CFR Ch. V (Oct. 1, 2001 Edition), pp. 473–475.
49 CFR §571.210, Seat belt assembly anchorages, Nat'l Highway Traffic Safety Admin., Dot, 49 CFR Ch. V (Oct. 1, 2001 Edition), pp. 568–572.

Primary Examiner—Peter M. Cuomo
Assistant Examiner—Stephen D'Adamo
(74) Attorney, Agent, or Firm—Andrus, Sceales, Starke & Sawall, LLP (57) ABSTRACT

The present invention pertains to a vehicle seat with an integrated frame and restraint assembly that is particularly suited for a truck. The frame assembly includes a seat frame mounted to a slide rail pedestal anchored to the vehicle floor, and a back frame joined to the seat frame. The frame has a lightweight construction and includes a conventional recline assembly for maintaining the seat back in one of a variety of recline positions. The restraint assembly has a lap and shoulder belt that is firmly secured to the frame. The seat frame has a pair of upwardly extending struts with rearward facing angled surfaces. The back frame has a pair of forwardly extending struts with forward facing angled surfaces. The angled surfaces flushly engage each other when the seat is in an upright position. Should the recline mechanism fail during a sudden deceleration or accident, the forward rotation of the back frame will stop at its upright position.

23 Claims, 8 Drawing Sheets

U.S. PATENT DOCUMENTS

| | | | |
|---|---|---|---|
| 5,362,132 A | | 11/1994 | Griswold et al. ............ 297/483 |
| 5,370,440 A | * | 12/1994 | Rogala .................. 297/216.14 |
| 5,466,001 A | | 11/1995 | Gotomyo et al. ......... 280/730.1 |
| 5,501,509 A | | 3/1996 | Urrutia .................. 297/452.18 |
| 5,549,357 A | | 8/1996 | Counts et al. ......... 297/354.13 |
| 5,568,961 A | * | 10/1996 | Colasanti ............... 297/362.12 |
| 5,641,198 A | | 6/1997 | Steffens, Jr. ............ 297/216.13 |
| 5,645,316 A | * | 7/1997 | Aufrere et al. ......... 297/216.13 |
| 5,651,514 A | * | 7/1997 | Grilliot et al. ........... 244/122 R |
| 5,667,235 A | | 9/1997 | Pearce et al. ........... 280/304.1 |
| 5,671,976 A | | 9/1997 | Fredrick ................ 297/452.18 |
| 5,697,670 A | | 12/1997 | Husted et al. ......... 297/216.13 |
| 5,722,731 A | | 3/1998 | Chang ....................... 297/473 |
| 5,782,537 A | | 7/1998 | Leistra et al. ............... 297/473 |
| 5,865,457 A | | 2/1999 | Knabusch et al. ....... 280/304.1 |
| 5,868,472 A | * | 2/1999 | Grilliot et al. ......... 297/452.18 |
| 5,909,926 A | * | 6/1999 | Gonzalez ............... 297/354.12 |
| 5,913,567 A | | 6/1999 | Novak et al. ............. 297/216.1 |
| 5,971,490 A | | 10/1999 | Chang ....................... 297/473 |
| 5,984,419 A | | 11/1999 | Partington et al. .......... 297/473 |
| 6,045,186 A | | 4/2000 | Butt et al. .................... 297/296 |
| 6,050,637 A | * | 4/2000 | H.ang.land et al. .... 297/216.14 |
| 6,056,366 A | | 5/2000 | Haynes et al. ......... 297/452.18 |
| 6,082,823 A | | 7/2000 | Aumont et al. ........... 297/452.2 |
| 6,227,563 B1 | | 5/2001 | Talisman .................... 280/735 |
| 6,270,111 B1 | | 8/2001 | Hanson et al. ............. 280/650 |
| 6,296,265 B1 | | 10/2001 | Lovins .................... 280/250.1 |
| 6,375,263 B1 | * | 4/2002 | Elio et al. ............... 297/354.12 |
| 6,471,292 B1 | * | 10/2002 | Sundgren et al. ...... 297/216.13 |
| 6,485,098 B1 | * | 11/2002 | Vits et al. ............... 297/216.13 |
| 6,554,356 B1 | * | 4/2003 | Crose .................... 297/216.13 |

* cited by examiner

VEHICLE SEAT FRAME AND BELT ASSEMBLY

CROSS REFERENCE TO RELATED APPLICATION

The present invention is based on and claims priority to U.S. Provisional Patent Application Ser. No. 60/363,692 filed on Mar. 11, 2002.

TECHNICAL FIELD OF THE INVENTION

The present invention relates to a vehicle seat, and more particularly to an integrated seat frame and restraint assembly for a reclining vehicle seat where the restraint assembly is secured to the seat frame, and the seat frame includes cooperating struts to limit forward rotation of the seat back during a sudden deceleration or accident.

BACKGROUND OF THE INVENTION

Vehicle seat designs include a wide variety of seat belt systems to help safely restrain an occupant in the event of a sudden stop or accident. The seat and restraint system should address a variety of design factors such as passenger comfort, ease of use, and safety during a sudden deceleration or impact. Federal Motor Vehicle Safety Standards (FMVSS) have been developed to help minimize the possibility of the failure of seat and restraint designs by the forces acting on them as a result of a vehicle impact. The weight of the seats and the fuel efficiency of the vehicle are also concerns of modern vehicle designs. Seat and restraint assemblies should be relatively compact and easily integrated into a variety of cabin dimensions and floor and wall construction so that the seat and restraint assembly can be installed in a variety of vehicles. Practical considerations such as cost and serviceability are also a part of the design criteria. Successful seat designs address each of these factors.

Many conventional vehicle seats anchor the seat belts directly to the floor or walls of the vehicle. These belt assemblies reduce the loads exerted on the seat and its frame so that the seat can remain relatively light in weight. Unfortunately, these nonintegrated seat and restraint designs can be impractical for adjustable seats that comfortably accommodate the passenger. Adjustably mounted seats can slide forward and back and can include a reclining seat back that allows the seat to comfortably accommodate a variety of passengers. Adjustable seats also allow each passenger to periodically adjust the seat to shift their body position to reduce fatigue. Seat belt assemblies anchored to the floor or wall of the vehicle are not readily adapted for use with these types of seats. Reclining seats are particularly problematic because lengthening or shortening the shoulder belt will not readily compensate for the fixed anchor point of the belt relative to the various recline positions of the seat. Seats with separate restraint systems are also more difficult to incorporate into the cabins of a wide variety of vehicle types. The floor and wall structures of the vehicle may not accommodate the desired anchor points for the lap and shoulder belts.

Some vehicle seat designs anchor the lap and shoulder belt to the seat frame. This typically involves securing or routing the shoulder belt over the upper end of the seat back. While these seat and seat belt systems are more readily adapted for adjustable seats with slide rails and reclining seat backs, the frame of the seat must be robustly designed to withstand the loads imparted on the vehicle seat by the momentum of the seat and its occupant during a rapid deceleration or accident. For example, FMVSS 571.207 entitled Seating Systems and 571.210 entitled Seat Belt Assembly Anchorages require a seat and seat belt assembly to withstand forces in excess of 3,000 pounds. Conventional lightweight recline mechanisms are not capable of withstanding these loads. Reclining seats and recline mechanism designs that meet these safety standards are usually bulky and prohibitively expensive because they require large, heavy components, or components made of exotic materials.

The seat and restraint system must also be comfortable and easy to use in order to be well received by the industry. The seat frame and restraint system should not inhibit or render it awkward or uncomfortable to move into or out of the seat. The front of the seat cushion should be free of rigid obstructions, particularly for truck seat designs. Truck seats are typically mounted on and elevated by a pedestal so that the legs of the occupant tend to press against the front of the seat cushion. In addition, the shoulder belt should not chafe the neck of the occupant, or cinch across the upper torso of the occupant.

The present invention is intended to solve these and other problems.

BRIEF DESCRIPTION OF THE INVENTION

The present invention pertains to a vehicle seat with an integrated frame and restraint assembly that is particularly suited for a truck. The seat frame assembly includes a seat frame mounted to a slide rail pedestal anchored to the vehicle floor, and a back frame joined to the seat frame. The frame has a lightweight construction and includes a conventional recline assembly for maintaining the seat back in one of a variety of recline positions. The restraint assembly has a continuous lap and shoulder belt that is directly secured to the seat frame at both its ends. The seat frame has a pair of upwardly extending struts with rearward facing angled surfaces. The back frame has a pair of forwardly extending struts with forward facing angled surfaces. The angled surfaces flushly engage each other when the seat is in an upright position. Should the recline mechanism fail during a sudden deceleration or accident, the forward rotation of the back frame will stop at its upright position.

One advantage of the present vehicle seat invention is its combined comfort and strength. The seat can recline for comfort during normal operation, yet is strong enough to maintain its integrity during a sudden forward deceleration or accident. The integrated restraint assembly has a continuous lap and shoulder belt that is firmly secured to the seat frame to help safely restrain the occupant. Each side of the frame assembly includes one set of cooperating struts. These two sets of struts prevent the forward rotation of the seat back should the lock assembly of the recline mechanism fail during a front-end collision. The struts provide added rigidity to the frame and stop the forward rotation of the back frame beyond its upright position. Tests indicate that the present seat frame and belt assembly maintains its integrity when loads or forces of over 3,900 pounds are imparted on the back frame. Accordingly, the present seat frame and restraint assembly should meet or exceeds current safety standards.

Another advantage of the present seat frame and belt assembly is its lightweight construction and economical materials. The seat frame components are made of strong, durable steel that is readily available and manufactured at relatively low cost. The seat frame and its struts are formed by hollow tubular components reinforced by stiffening plates to produce a compact and lightweight seat frame. The design also incorporates a conventional lightweight recline and locking mechanism. The struts allow the lock mechanism of the recline assembly to fail during a simulated 20G deceleration, such as those required by the FMVSS tests. Thus, the present invention is able to use a lightweight seat frame assembly with a conventional lightweight recline and lock mechanism to achieve a fuel efficient seat frame and restraint assembly while meeting FMVSS requirements.

A further advantage of the present seat frame and belt assembly is its simplicity and compact design. The two sets of triangular shaped struts allow the seat design to maintain standard height and width dimensions so that the seat will easily fit into the cabin of most commercial trucks. The seat is equipped with a conventional recline and lock mechanism so these components do not pose any unusual installation problems. The shoulder belt is looped through a D-ring toward the top of the seat back frame, and is received and anchored by a conventional lightweight retractor at the rear of the seat frame. Bulky and complicated frame assemblies and recline and locking mechanisms are avoided. The result is a compact seat frame and restraint assembly with an attractive appearance that is easily incorporated into the relatively tight space requirements of a wide variety of vehicles.

A still further advantage of the present seat and restraint assembly is its comfort, easy of use and attractive appearance. The seat frame and restraint system is easily negotiated by an occupant when he or she enters or exits the seat. The struts extend less than two inches above the seat frame and four inches forward from the back frame platforms upon which the seat cushion and back cushions are placed. The seat and back cushions extend beyond all or a majority of the struts so they do not detract from the seats appearance. The small distance the struts extend from the seat and back platforms do not obstruct the person from entering or exiting the seat. The triangular shaped struts taper at an angle of about 10 degrees toward the front end of the seat frame and top end of the back frame. The front of the seat frame is free of obstructions. The tapered seat struts do not tend to interfere with or inconvenience people when they rest on and compress the side of the seat cushion as they enter or exit the seat. The tapered back struts do not interfere or inconvenience the arm movements of people when they are sitting in the seat. In addition the shoulder belt is oriented so that it will not chafe the neck of the occupant or cinch across the upper torso of the occupant.

Other aspects and advantages of the invention will become apparent upon making reference to the specification, claims and drawings.

DESCRIPTION OF THE PREFERRED EMBODIMENTS

While this invention is susceptible of embodiment in many different forms, the drawings show and the specification describes in detail preferred embodiments of the invention. It should be understood that the drawings and specification are to be considered an exemplification of the principles of the invention. They are not intended to limit the broad aspects of the invention to the embodiments illustrated.

The present invention relates to a seat frame and seat belt assembly generally indicated by reference number 10 and shown in FIGS. 1–5. The seat frame and belt assembly 10 includes a seat frame assembly 15 with a seat frame portion 20 and a reclinable back frame portion 70. The majority of the seat frame 15 is formed by tubular metal components and reinforcing plates. The components are made of steel. The tubular components are hollow with a generally square cross-sectional shape having a width of one inch and a wall thickness of 0.083 inches or 0.211 millimeters. These components produce a strong and lightweight seat frame construction.

The seat or bench frame portion 20 has a main body with a front end, a rear end and two opposed sides. The seat frame 20 is formed by several frame members including a front member 22, a rear member or cross strut 23, and opposed side members 25 and 26. The seat frame members 22, 23, 25 and 26 form a substantially planar platform 27 for supporting a seat cushion 28 and the weight of the occupant. The front and rear members 22 and 23 are substantially parallel to each other, and are substantially perpendicular to opposed side members 25 and 26 so that the platform 27 has a generally rectangular shape with a width of about 18 inches (450 mm) and a depth of about 19 inches (475 mm). The front 22, rear 23 and side 25 and 26 members preferably define the front and rear ends and sides of the seat frame 20. The seat frame 20 includes a number of mounting plates 29. One mounting plate 29 is welded or otherwise rigidly secured to the two members forming each corner of the seat frame 20.

Figure 6A:
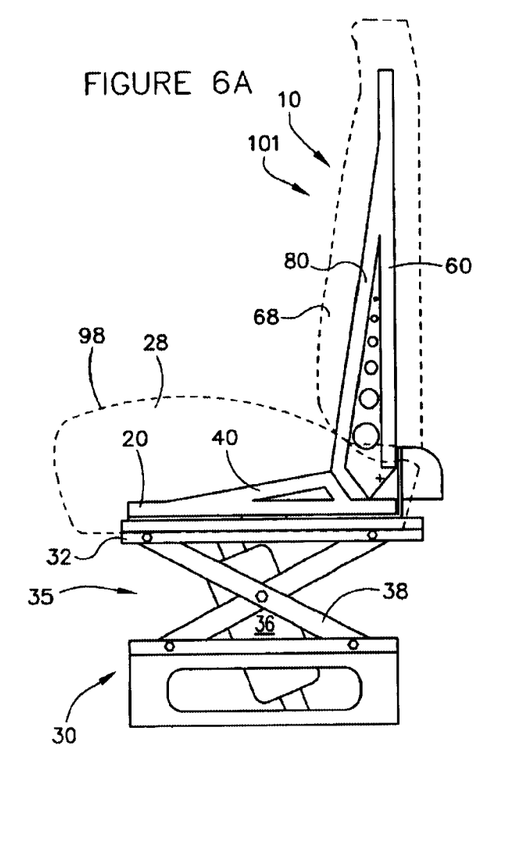
FIG. 6A is a side schematic view showing a first seat frame and strut geometry with the seat in its upright position.
Figure 6B:
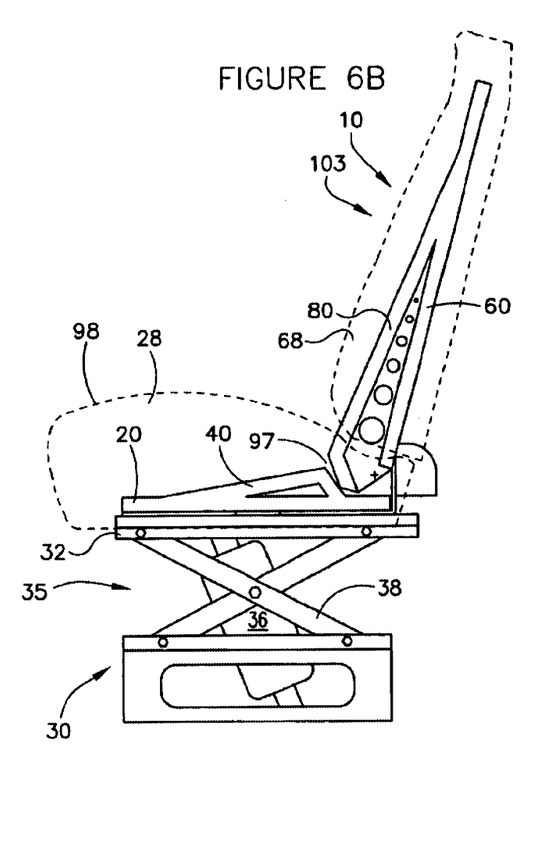

A pedestal 30 is rigidly mounted or anchored to the floor of the vehicle and spaces the seat frame 20 from the floor as shown in FIGS. 6A and 6B. The pedestal 30 is preferably of the type sold by Bostrom Seating, Inc. of Piedmont, Ala. as Model No. AIR-T915. The pedestal 30 includes a slide rail 32 to allow the occupant to selectively position the seat 15 forward or rearward in the truck cabin. The mounting plates 29 of the seat frame 20 are bolted or otherwise rigidly secured to an upper slidable portion of the slide rail 32. The pedestal 30 also includes a height adjustment and shock absorber mechanism 34, such as a mechanism including a pneumatic chamber 36 and a pair of lift members 38. The mechanism 34 allows the occupant to selectively position the platform 27 of the seat frame 20 a desired distance from the floor and cushion the occupant when the truck drives over a particularly difficult or challenging road surface, such as one with many bumps and pot holes. The pedestal 30 weighs about 70 pounds and can adjust the height of the seat frame 20 and cushion 28 within the range of 16 to 22 inches from the floor.

The seat frame 20 includes a pair of opposed upwardly projecting struts 40 and 42 that combine with their respective opposed side members 25 or 26 to form a pair of triangular truss structures. Each strut 40 and 42 includes a forward brace member 46 and a rearward abutment member 47. The brace and abutment members 46 and 47 are preferably formed by a single metal tube that is notched, bent and welded back together to form a generally L-shaped joint. Similar to the seat frame 20, the metal tube forming each strut 40 and 42 is hollow with a generally one inch square cross-sectional shape with a wall thickness of 0.083 inches (0.211 mm) to form a strong, lightweight construction.

The front end of each brace 46 is welded or otherwise rigidly secured toward the front end of the seat frame 20 via side members 25 and 26. The braces 46 preferably extend from their opposed side member 25 or 26 at an angle of about 10 degrees. The rear end of each abutment 47 is also welded or otherwise rigidly secured toward the rear end of the seat frame 20 via side member 25 or 26. The abutments 47 preferably extend upwardly from their opposed side member 25 or 26 at an angle of about 55 degrees. As noted above, the rear or upper end of each brace 46 is welded or otherwise rigidly connected to the front or upper end of each abutment 47 to form an L-shaped joint or angle of about 135 degrees. The top or apex of the struts 40 and 42 extends about 2 inches (51 mm) above the platform 27 of the seat frame 20, and is located about 5 inches (125 mm) from the rear end of the seat frame. The seat cushion 28 has a thickness or height of about 2½ inches (64 mm) near its sides so that it extends above and conceals the majority of the struts 40 and 42 to allow an occupant to easily move into and out of the seat 10 without bumping into or otherwise negotiating over the struts.

Each strut 40 and 42 has an outside or rearwardly facing angled surface or face 48 formed by its abutment 47. The two abutments 47 are in registry so that angled surfaces 48 have a generally planar orientation relative to each other. Each abutment 47 is spaced a predetermined distance of about 4 inches from the rear member 23 of the seat frame 20 to provide an exposed upper bearing surface 49 toward the rear end of each side member 25 and 26. These bearing surfaces 49 also have a generally planar orientation relative to each other. Each of the two sets of surfaces 48 and 49 intersect to form an angle of about 125 degrees.

The back frame 60 has a main body with a top end, a bottom end and two opposed sides. The back frame 60 is formed by several back frame members including upper member 62, opposed side members 65 and 66. The frame members 62, 65 and 66 are substantially planar platform 67 for supporting a back cushion 68 and the weight of the occupant when the seat is in a recline position as discussed below. The upper member 62 is substantially parallel to cross strut 23 and substantially perpendicular to opposed side members 65 and 66 so that the main body has a generally rectangular shape with a width of about 18 inches (450 mm) and a height of about 28 inches (700 mm). The top 62 and side 65 and 66 members preferably define the top end and sides of the back frame 60. The back frame 60 includes an upper cross brace 69 that extends between and is rigidly secured to each opposed side member 65 and 66. A bracket 71 is located at an upper right corner of the frame 60, and rigidly secured to the front surfaces of frame members 62, 65 and 69. The bracket 71 has an opening 72 aligned between top member 62 and cross brace 69. The bracket 72 includes a D-ring 75 with a cooperating opening 76 aligned with opening 72.

The back frame 60 includes a pair of opposed forwardly projecting struts 80 and 82 that combine with their respective opposed side members 65 or 66 to form a pair of triangular truss structures. Each back strut 80 and 82 includes an upper brace member 86 and a forward abutment member 87. The brace and abutment members 86 and 87 are preferably formed by a single metal tube. The tube is notched, bent and welded back together to form a generally L-shaped joint. Similar to the seat struts 40 and 42, the metal tube forming each back strut 80 and 82 is hollow with a generally one inch square cross-sectional shape with a wall thickness of 0.083 inches (0.211 mm) to form a strong, lightweight construction.

The upper end of each brace 86 is welded or otherwise rigidly secured toward the top end of the back frame 60, and preferably toward the upper end of its opposed side members 65 and 66. The braces 86 extend from their opposed side member 65 or 66 at an angle of about 10 degrees as best shown in FIGS. 6A and 6B. The abutments 87 extend from their corresponding brace 86 at an angle of about 135 degrees. Each abutment 87 has an outside or forward facing angled surface or face 88. The free end of the abutment 87 forms another downward facing bearing surface 89. The abutments 87 are in registry so that forward angled surfaces 88 have a generally planar orientation to each other. The downward surfaces 89 also have a generally planar orientation to each other. Each of the two sets of surfaces 88 and 89 intersect to form an angle of about 125 degrees to allow them to flushly mate with surfaces 48 and 49, respectively. The front or apex of the struts 80 and 82 extend about 3.5 inches (89 mm) from the back frame 60, and is located about 2 inches (51 mm) from the bottom end of the back frame. The back cushion 68 has a thickness of about 1.5 inches (38 mm) near its sides so that it extends beyond and conceals the majority of the struts 80 and 82 to allow the occupant to easily move into and out of the seat 10 without bumping into or otherwise negotiating around the struts.

Figure 7A:
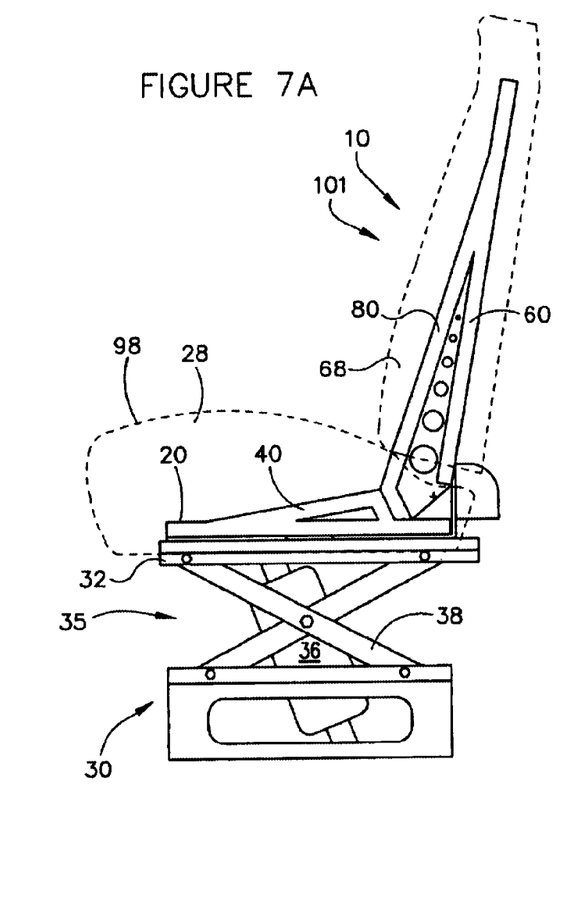
FIG. 7A is a side schematic view showing the first seat frame and strut geometry with the seat in its fully reclined position.
Figure 7B:
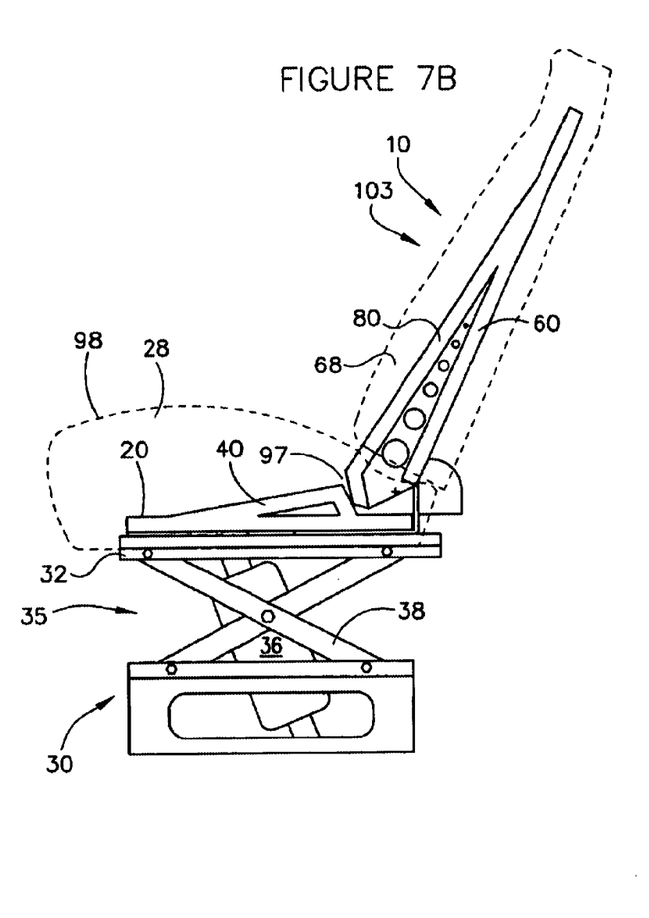
FIG. 7B is a side schematic view showing the second seat frame and strut geometry with the seat in its fully reclined position.

Although the seat frame 15 and its struts 40, 42, 80 and 82 have been shown and described to have a particular geometry as shown in FIGS. 6A and 6B, it should be understood by those skill in the art that different seat and strut geometries can be used without departing from the broad aspects of the invention. For example, the back frame 60 can be rotated to an angle of about 110 degrees relative to the seat frame 20 when the seat 10 is in its upright position 101 as in FIG. 7A. The bearing surfaces 48 and 88 of the struts 40, 42, 80 and 82 are at an angle of about 70 degrees relative to the seat frame 20. Bearing surfaces 48, 49, 88 and 89 release when the back frame 60 is rotated to one of its intermediate positions or to its full recline positions 103 as in FIG. 7B.

Each strut 80 and 82 of the back frame 60 includes a reinforcement plate or gusset 91 or 92. The reinforcement plates 91 and 92 have a thickness of about 12 inches (3.0 mm). The plates 91 and 92 have generally triangular shaped perimeters and are sized to flushly engage the outer surfaces of members 65, 86 and 87, or members 66, 86 and 87, respectively. The perimeter of the reinforcement plates 91 and 92 are welded or otherwise rigidly connected to these members to provide an integral structure. An arm rest bracket 94 provides some additional reinforcement to strut 80. A shielding device (not shown) is added to the seat frame 15 to prevent objects from entering the gap 97 between the angled surfaces 48 and 88 of the struts 40, 42, 80 and 82 when the seat is in a recline position 102 or 103. The shielding device can take a variety of forms, such as a pair of plates secured to the sides of cooperating struts 40 and 42 that cover the sides of the gap 97. The outer fabric 98 of the seat 10 covers the shield device and gap 97.

Figure 1:
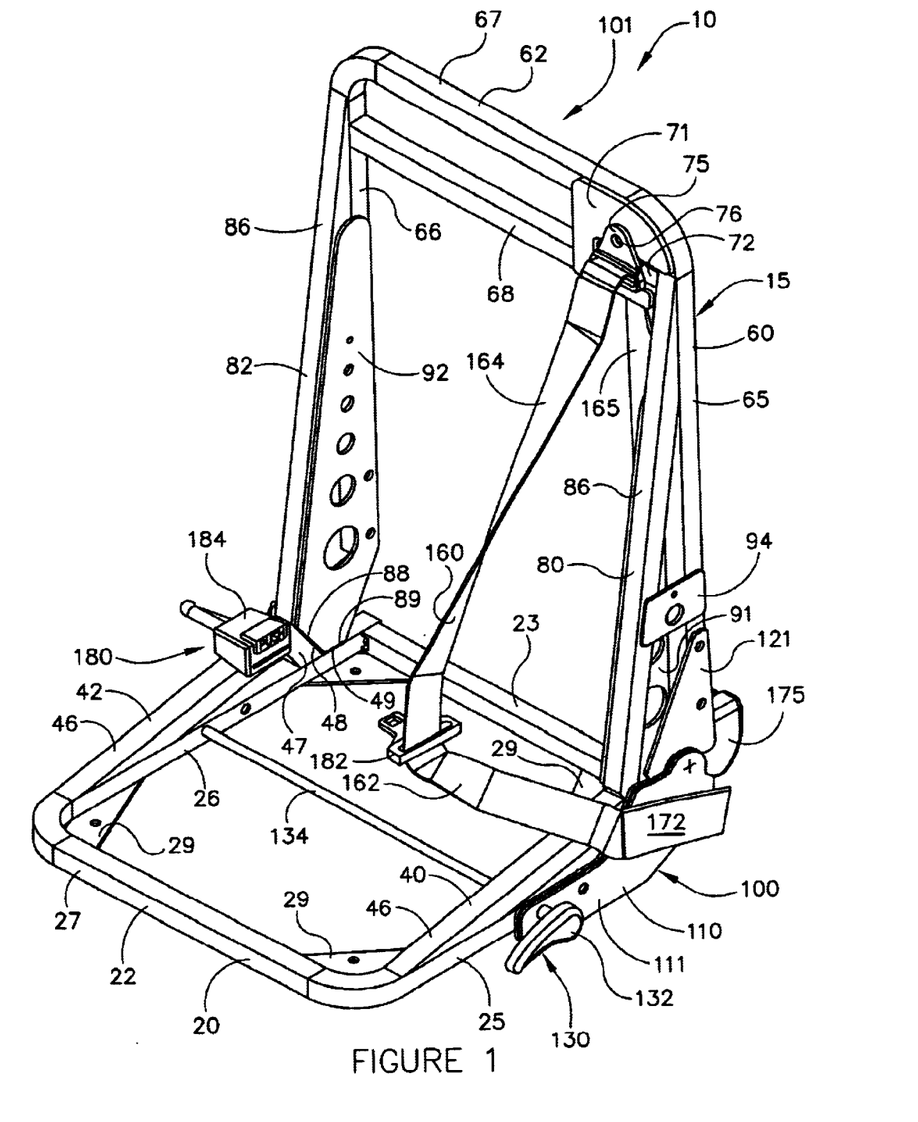
FIG. 1 a front perspective view of the seat frame and seat belt assembly shown in an upright position.
Figure 2:
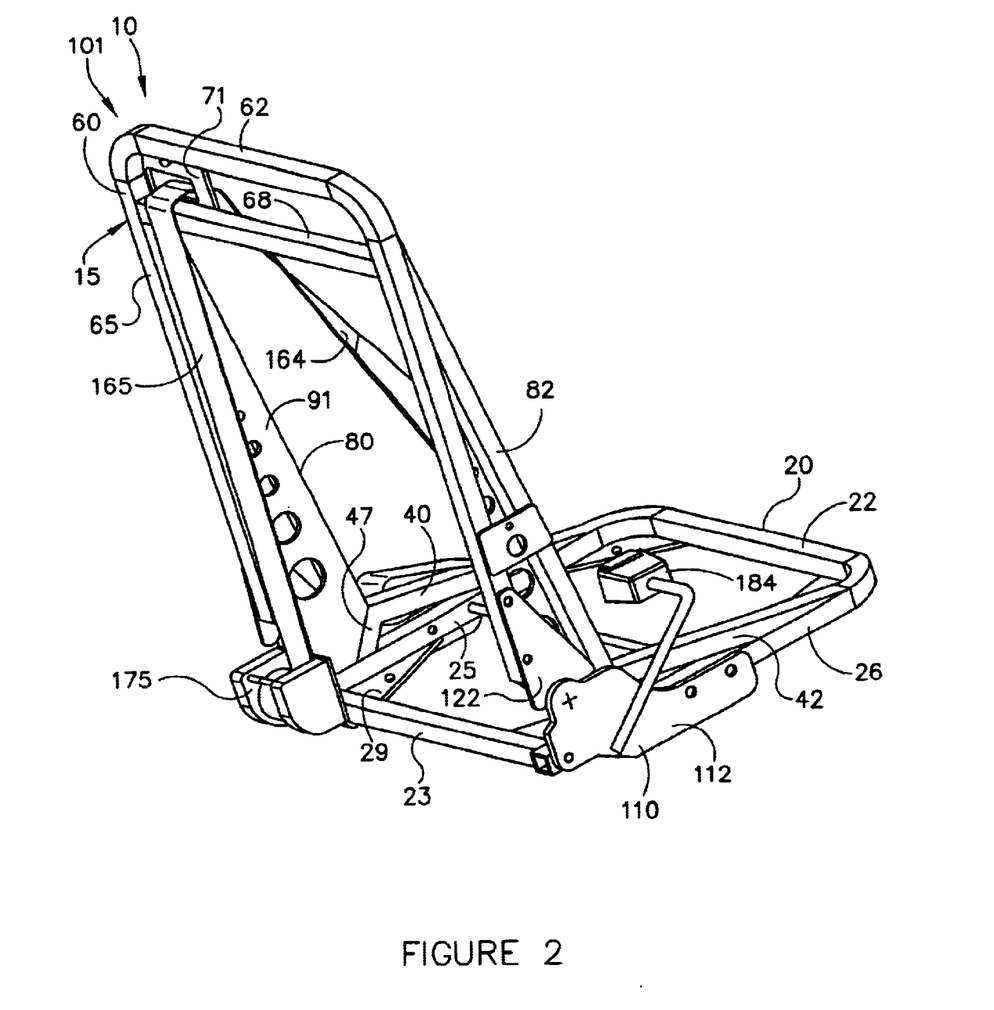
FIG. 2 is a rear perspective view of the seat frame and seat belt assembly in its upright position.
Figure 3:
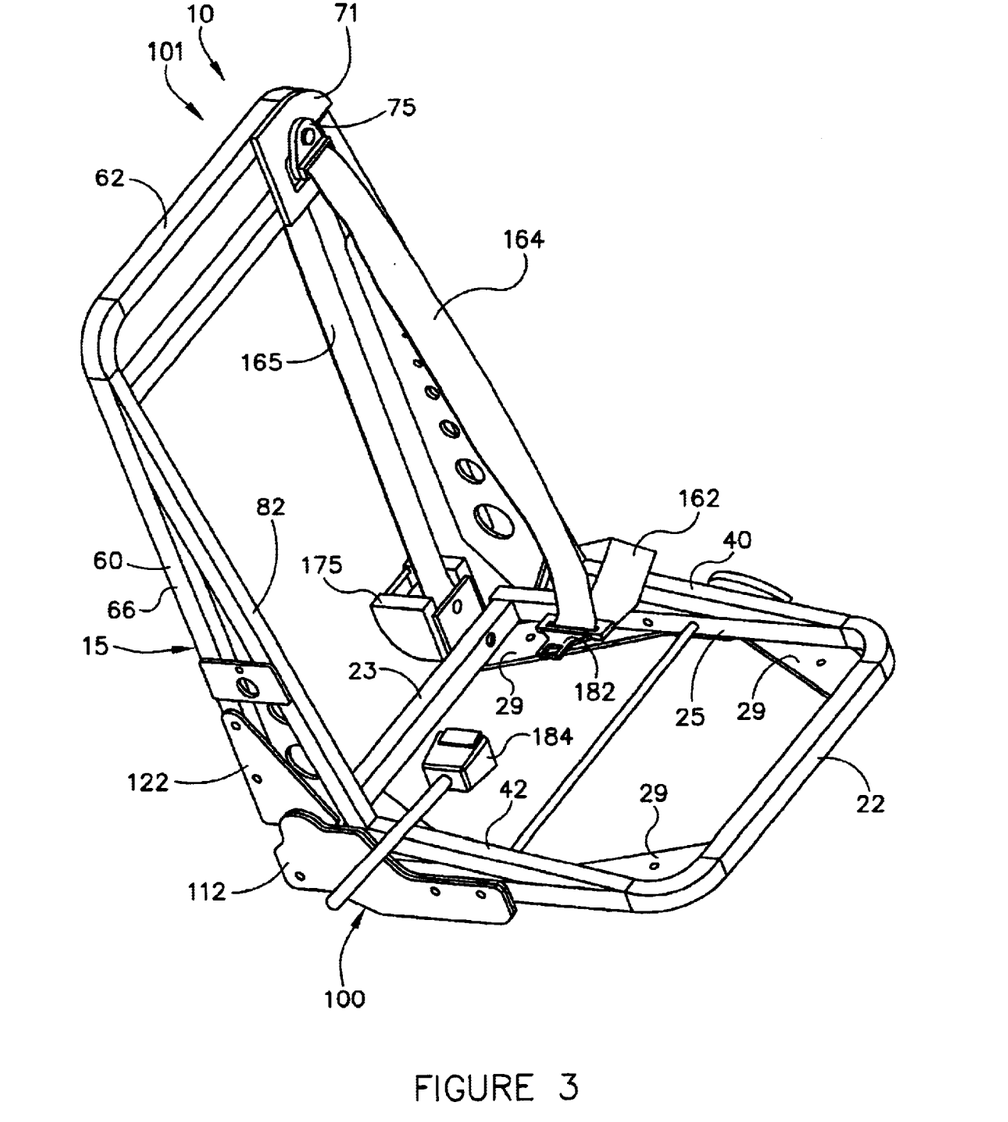
FIG. 3 is a second front perspective view of the seat frame and seat belt assembly.
Figure 4:
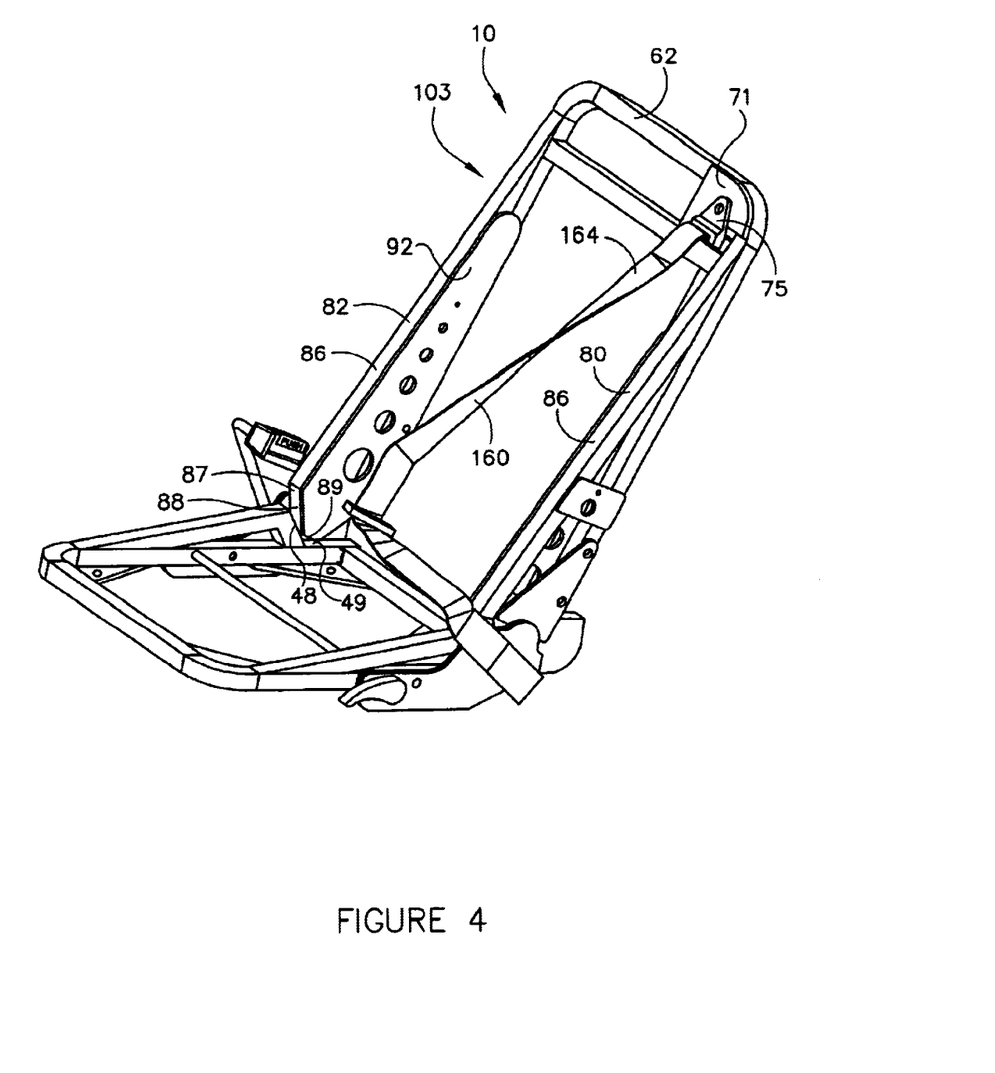
FIG. 4 is a front perspective view of the seat frame and seat belt assembly shown in a reclined position.
Figure 5:
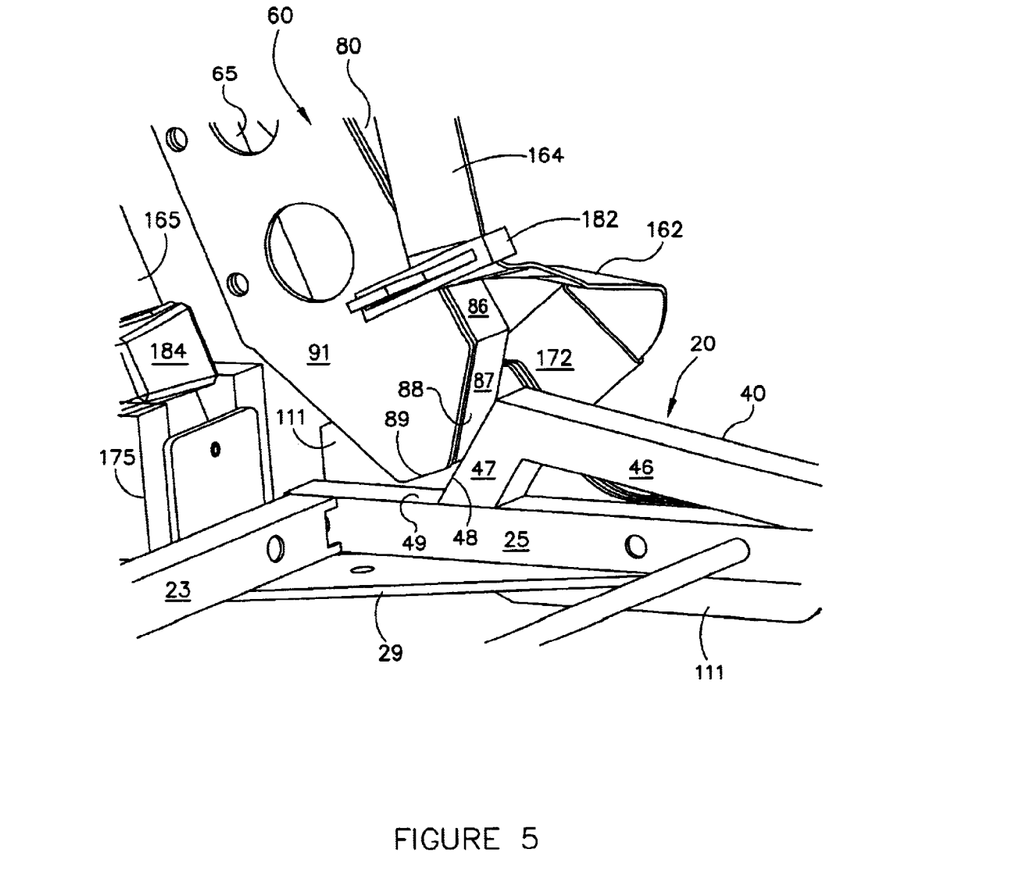
FIG. 5 is an enlarged view showing the orientation of the seat back and seat frame when in a reclined position.

The seat frame 15 includes a conventional rotation or recline assembly 100 that joins the back frame 60 to the seat frame 20 in a selectively rotatable manner. The recline assembly 100 is preferably a conventional recliner of the type sold by Johnson Safety, Inc. of Taiwan. The recline assembly 100 allows the back frame 60 to selectively rotate between an upright position 101 as in FIGS. 1 and 6A and a full recline position 103 as shown in FIGS. 4 and 5. The back frame 60 rotates about an axis of rotation 105. The back frame 60 rotates about 15 degrees to its full recline position 103 where the back frame is at an angle of about 75 degrees relative to the seat frame 20 as shown in FIG. 6B. The maximum recline angle of 15 degrees is a function of the recline mechanism 100, and is not due to any abutting engagement of the components of the seat frame 15.

The ABTS recline assembly 100 has cooperating fixed plates 111 and 112 that are welded or otherwise rigidly secured to the opposed side members 25 and 26 of the seat frame 20. The fixed plates 111 and 112 form a hinged joint, such as a pair of inwardly projecting in-line pins (not shown) toward the rear end of the fixed plates. These pins form the axis of rotation 105. The recline assembly 100 also includes a pair of rotatable plates 121 and 122 that are welded or otherwise rigidly secured to the lower end of the opposed side members 65 and 66 of the back frame 60. Each rotation plate 121 and 122 has an opening (not shown) for matingly receiving one of the in-line pins. The pinned connection or joint between the back frame 60 and the seat frame 20 permits rotatable movement of the back frame 60 about the axis or pivot line 105 formed by the pins.

The recline assembly 100 includes a conventional lock or catch mechanism 130 for securing the back frame 60 into one of several positions at or between the upright and full recline positions 101 and 103. The lock mechanism 130 selectively locks and unlocks the recline mechanism 100 and back frame 60 into a desired recline position. The lock mechanism 130 includes a rotatable handle or lever 132 secured to one end of a solid lock shaft 134. The lock shaft 134 extends between and is rotatably secured to opposed side members 25 and 26. The lock shaft 134 extends through a preformed hole in each side member 25 and 26. A conventional linkage (not shown) connects each end of the lock shaft 134 to a conventional ratchet mechanism (not shown) that is biased to lock the back frame 60 in a set position when the handle 132 is released. Rotating handle 132 dislodges the ratchet mechanism to allow the back frame 60 to rotate forward or rearward to the upright position 101, any one intermediate position, or the full recline position 103.

When the back frame 60 is in its upright position 101, the surfaces 88 and 89 of the back frame struts 80 and 82 are in abutting engagement with the surfaces 48 and 49 of the seat frame struts 40 and 42 as shown in FIG. 6A. This abutting engagement prevents the back frame 60 from rotating any further forward. When the back frame 60 is in any position other than its upright position 101, the surfaces 88 and 89 separate from and do not engage surfaces 48 and 49, respectively, as shown in FIG. 6B. The back frame 60 is held in the selected desired partially or fully reclined position 103 by the locking mechanism 130 of the rotation assembly 100.

The seat and belt assembly 10 includes a seat belt assembly 150 for restraining an occupant. The belt assembly 150 is a Type 2 restraint with a conventional seat belt 160 having a lap portion 162, a shoulder portion 164 and a back portion 165. One end of the belt 160 is securely fixed to the fixed rotation mechanism 111 via a connector 172. The connector 172 is securely attached to the fixed plate 111, but is free to rotate relative to the fixed plate. The belt 160 passes through the opening 76 of the D-ring 75 and the cooperating opening 72 of the bracket 71. The other end of the belt 160 is received into a conventional retractor or receiver 175. The retractor 175 is rigidly secured to the rear end of the seat frame 20, and preferably to cross strut 23. While the belt 160 is retained by the D-ring 75 and must pass through it, the belt is free to slide into and out of the D-Ring unless locked in place by the retractor 175.

A conventional latch mechanism 180 is provided to secure the belt 160 in place around the occupant. The latch mechanism 180 includes cooperating male and female latches 182 and 184. The male latch 182 has an opening 185 through which the belt 160 passes. The male latch 182 is free to slide up and down the belt 160 between the D-ring 75 and the connector 172. The female latch 184 is rigidly secured to the seat frame 20 via the fixed rotation mechanism 112. The belt 160 and male latch 182 are pulled over or around the occupant after they sit down. The male latch 182 is inserted into and releasably fixed or otherwise locked to the female latch 184. When locked, the lap portion 162 of the belt 160 extends from the connector 172 on one side of the seat 15 to the locked latch mechanism 180 on the other side of the seat. The shoulder portion 164 extends from the latch mechanism 180 to the D-ring 75. The back portion 165 of the belt extends from the D-ring 75 to the retractor 175. The seat and restraint assembly 10 including its cushions 28 and 68 and outer fabric 98 weighs about 43 pounds. The combined weight of the seat 10 and pedestal 30 is about 100 pounds.

During a sudden forward deceleration or accident, the retractor 175 locks the back portion 165 of the belt 160 so that the belt is not free to unroll from the retractor and slide up through the D-ring 75 or the opening in the male latch 182. During this deceleration, the momentum of the occupant and the mass of the back frame 60 tend to pull the back frame forward toward the front end of the seat frame 20. The locking mechanism 130 of the reclining assembly 100 is not designed to resist the large loads and impulse forces generated by or otherwise associated with sudden decelerations. As a result, the lock mechanism can break or otherwise release, and allow the back frame 60 to rotate forward from an intermediate or full recline position 103 to its upright position 101. The forward rotation of the back frame 60 stops at the upright position 101 when surfaces 88 and 89 of the back frame 60 simultaneously abutingly engage surfaces 48 and 49 of the seat frame. The forces exerted by the seat struts 40 and 42 on the back struts 80 and 82 counteract the forces created by the deceleration of the seat 10 and its occupant. The struts 40, 42, 80 and 82 prevent the seat 15 from folding over on itself, and the seat belt assembly 150 helps restrain the occupant in the seat.

Figure 8:
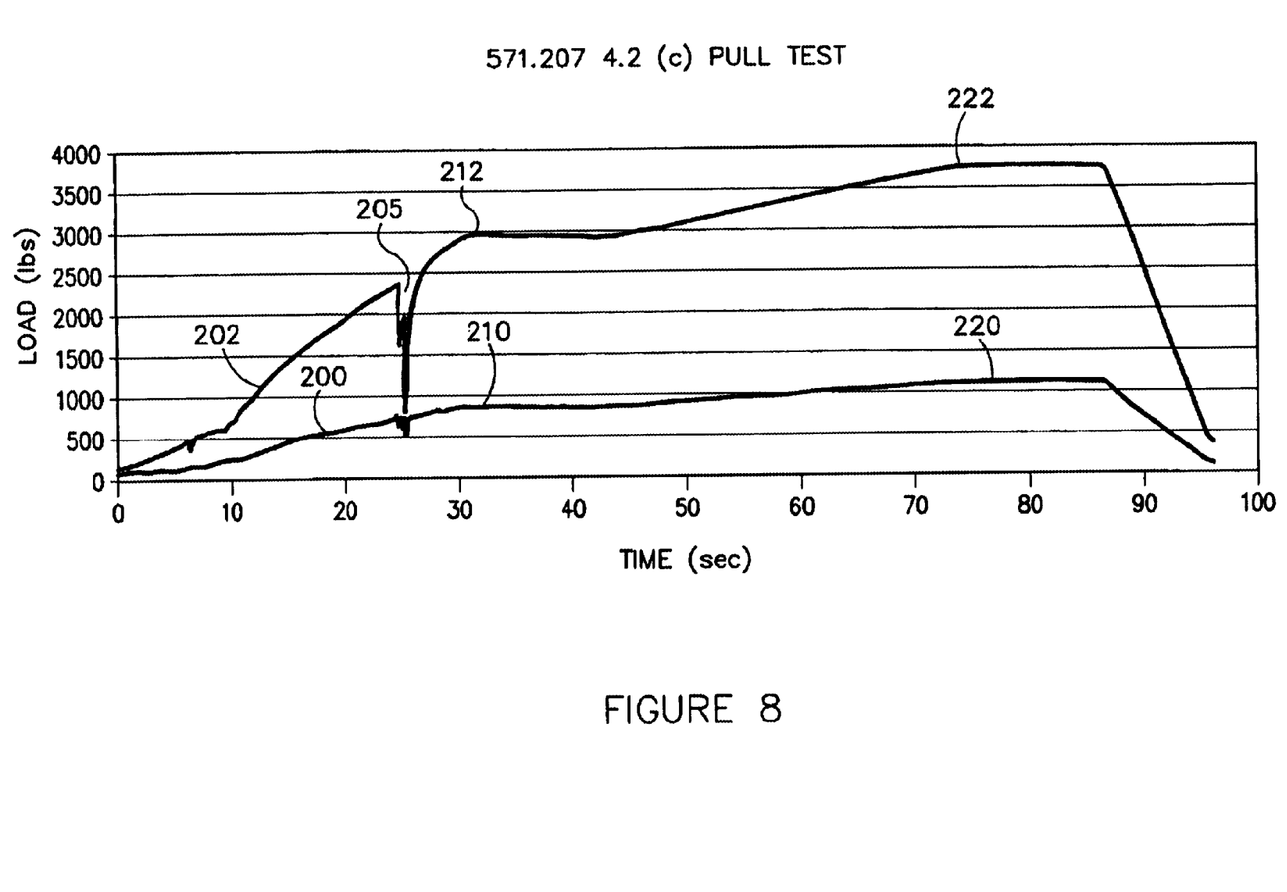
FIG. 8 is a graph showing the results of a pull test conducted in accordance with Federal Motor Vehicle Safety Standard pull test 571.207 S4.2(c) applying a combination of seat mass and lap and shoulder loads to the seat and restraint assembly.

FIG. 8 shows the results of a pull test on the seat and restraint assembly 10 conducted in accordance with Federal Motor Vehicle Safety Standard (FMVSS) 571.207 S4.2(c). As noted above, the seat 10 includes a Type 2 restraint assembly 150 with lap and shoulder belt portions 162 and 164. The seat 10 is in its full recline position 103 at the beginning of the pull test. A combination of three loads are simultaneously applied to the seat 10. In accordance with S4.2(c), a seat mass load is applied to through the center of gravity of the seat 10, a lap belt load is applied to the lap portion 162 of the belt 160, and a shoulder belt load is applied to the shoulder portion 164 of the belt. At the start of the test, the seat 10 is in a relaxed condition with each load being zero. The loads are then increased over time as shown in FIG. 8. The seat mass load is plotted as line 200. The lap belt load and shoulder belt loads are the same and are plotted as line 202. The locking mechanism 130 of the recline assembly 100 fails about twenty-five (25) seconds into the test when the lap and shoulder belt loads reach about 2,400 pounds as shown at 205. When this failure occurs, the back frame 60 rotates forward to its upright position 101 where the struts 40, 42, 80 and 82 engage and stop the forward rotation of the seat back. Thirty (30) seconds into the test, the seat mass load is 860 pounds as shown at 210, or twenty (20) times the weight of the 43 pound seat 10 in accordance with S4.2(a). The lap and shoulder belt loads 202 are 3,000 pounds as shown at 212 in accordance with S4.2(c). These loads are simultaneously held for ten (10) seconds. The loads are then increased to 130% of the loads required by S4.2. At about seventy-five (75) seconds into the pull test the seat mass load reaches about 1113 pounds as shown at 220, and the lap and shoulder belt loads reach about 3,900 pounds as shown at 222. These loads are also simultaneously held for ten (10) seconds before concluding the pull test.

The various components forming the seat frame 15, including the back frame 20 and 60 and their associate struts 40, 42, 80 and 82 and gussets 91 and 92, are robustly designed to maintain their integrity while withstanding or absorbing the loads associated with a sudden deceleration or impact, and passing the loads through the pedestal 30 to the floor of the vehicle. Although FMVSS 571.210 S4.2.3 indicates that a seat frame 15 would pass the test even if the frame permanently deforms or ruptures during the test as long as the frame sustains the required load for the specified time, the present seat frame 15 experiences little or no visible or measurable plastic deformation as a result of the S4.2(c) pull test. The seat frame 15 retains its integrity both when the locking mechanism 130 fails and during the ten second hold at the specified 860 and 3,000 loads. The seat frame 15 also retains its integrity when these loads are elevated 130%. The seat frame 15 does not rupture or permanently deform. However, it should be understood by those skilled in the art that some amount of plastic deformation could be experienced by one or more of the components forming the seat frame 15 without degrading the integrity of the seat frame. The integrity of the seat frame 15 would be compromised if the deformation resulting from one test would cause the seat frame to fail during a subsequent test or accident. On the other hand, the seat belt 160 is permanently stretched many inches in length as a result of the pull test, and should be replaced before another test is conducted so that the belt performs as intended.

While the invention has been described with reference to a preferred embodiment, it will be understood by those skilled in the art that various changes may be made and equivalents may be substituted without departing from the broad aspects of the invention.

I claim:

1. A vehicle seat and restraint assembly for supporting an occupant and restraining their lap and upper torso during a sudden deceleration, said vehicle seat and restraint assembly comprising:

a frame assembly including a seat frame and a back frame, said back frame being rotatably joined to said seat frame and movable through a range of positions between an engaged position and a lower recline position;

a set of cooperating first and second struts, said first strut extending upwardly from said seat frame and forming a rearwardly facing abutment, and said second strut extending forwardly from said back frame and forming a forwardly facing abutment, said rearwardly facing abutment of said first strut abuttingly engaging said forwardly facing abutment of said second strut when said back frame is in said engaged position;

a recline assembly secured to said frame assembly and movably joining said back frame to said seat frame, said recline assembly selectively positioning said back frame at a desired position relative to said seat frame; and, a restraint assembly having a lap portion for engaging the lap of the occupant and an upper torso portion for engaging the upper torso of the occupant, both said lap portion and said shoulder portion being fixedly secured to said frame assembly.

2. The vehicle seat and restraint assembly of claim 1, and wherein said forwardly and rearwardly facing abutments of said struts are angled surfaces, said angled surfaces flushly mating when in said engaged position.

3. The vehicle seat and restraint assembly of claim 2, and wherein back frame is about normal to said seat frame when in said engaged position, and said angled surface of said first strut is fixed at an angle of about 55 degrees relative to said seat frame, and said angled surface of said second strut is fixed at an angle of about 35 degrees relative to said back frame.

4. The vehicle seat and restraint assembly of claim 1, and wherein said vehicle seat complies with pull test requirements of Federal Motor Vehicle Safety Standard 571.207 Section 4.2(c) Oct. 1, 2001, and supports an upper torso load of 3,000 pounds applied to said shoulder portion of said restraint assembly and a seat mass load of 20 times the mass of the seat multiplied by 9.8 applied through a center of gravity of said seat, both of said loads being simultaneously held for a duration of ten seconds.

5. The vehicle seat and restraint assembly of claim 4, and wherein said vehicle seat is a truck seat, and said frame and struts retain their integrity when simultaneously supporting upper torso and seat mass loads equal to 130 percent of said Section 4.2(c) pull test requirements.

6. The vehicle seat and restraint assembly of claim 5, and wherein said frame assembly and struts are generally formed from hollow tubular component parts made of steel.

7. The vehicle seat and restraint assembly of claim 1, and wherein said seat frame has front and rear ends and opposed sides, and said back frame has bottom and top ends and opposed sides, and said first strut is directly secured to said seat frame and said second strut is directly secured to said seat back.

8. The vehicle seat and restraint assembly of claim 7, and wherein said first strut is rigidly secured to said seat frame proximal said front end of said seat frame, and said first strut extends along a majority of its said side of said seat frame, and wherein said second strut is rigidly secured to said back frame proximal said top end of said back frame, and said second strut extends along a majority of its said side of said back frame.

9. The vehicle seat and restraint assembly of claim 8, and wherein said first strut has an upper surface angled about 10 degrees from said seat frame, and said rearward facing surface is angled about 55 degrees from said seat frame.

10. The vehicle seat and restraint assembly of claim 9, and wherein said second strut has a forward surface angle about 10 degrees from said back frame, and said forward facing surface is angled about 35 degrees from said back frame, and said seat back is about normal to said seat frame when in said engaged position.

11. The vehicle seat and restraint assembly of claim 8, and wherein said first strut includes a first elongated brace and a first abutment member, said first brace being angled about 10 degrees from said seat frame, and said first abutment member being angled about 55 degrees from said seat frame, and said second strut includes a second elongated brace and a second abutment member, said second brace being angled about 10 degrees from said back frame, and said second abutment member being angled about 35 degrees from said back frame.

12. The vehicle seat and restraint assembly of claim 11, and wherein said seat frame includes a side frame member, and said first brace and first abutment member of said first strut are rigidly joined to a side frame member to form a triangular truss with a rearwardly facing surface offset from said rear end of said seat frame a predetermined distance.

13. The vehicle seat and restraint assembly of claim 7, and further including a second set of cooperating first and second struts, one set of said cooperating struts being located on each opposed side of said frame assembly.

14. The vehicle seat and restraint assembly of claim 1, and wherein said seat frame is mounted to a pedestal having a slide rail and a height adjustment mechanism, said slide rail being secured toward an upper end of said pedestal to allow selective forward and rearward positioning of said frame assembly, said height adjustment mechanism being secured to said frame assembly to allow selective upward and downward positioning of said frame assembly.

15. The vehicle seat and restraint assembly of claim 1, and wherein said engaged position is an upright position.

16. The vehicle seat and restraint assembly of claim 1, and wherein said lap and shoulder restraint includes a single continuous belt.

17. The vehicle seat and restraint assembly of claim 16, and wherein said restraint assembly includes a latch mechanism securely mounted to said seat frame, said latch mechanism including a mating latch slidingly joined to said belt, said latch selectively connecting to and disconnecting from said latch mechanism.

18. The vehicle seat and restraint assembly of claim 17, and wherein said belt has a connected end and a retracting end, said connected end being securely connected by a connector mounted to said seat frame, and said retracting end being retractably received and securely connected by a retractor mounted to said seat frame.

19. The vehicle seat and restraint assembly of claim 18, and wherein said connector is mounted to one side of said seat frame and said latch mechanism is mounted to an opposite side of said seat frame, said latch dividing said belt into said lap portion that engages and restrains the lap of the occupant and said shoulder portion that engages and restrains the upper torso of the occupant.

20. The vehicle seat and restraint assembly of claim 19, and wherein said seat frame has a rear end with said retractor mounted to said rear end, said back frame has top end with a guide ring secured toward said top end, and said shoulder portion of said belt extends from said latch mechanism through said guide ring to said retractor.

21. The vehicle seat and restraint assembly of claim 1, and wherein said back frame is rotatably joined to said seat frame by a rotation assembly, said recline mechanism being a portion of said rotation assembly.

22. A vehicle seat and restraint assembly for supporting an occupant and restraining their lap and upper torso during a sudden deceleration, said vehicle seat and restraint assembly comprising:

a frame assembly including a seat frame and a back frame, said seat frame having front and rear ends and opposed sides, and said back frame having bottom and top ends and opposed sides, said back frame being rotatably joined to said seat frame and movable through a range of positions between an engaged position and a lower recline position;

two sets of cooperating first and second struts, each of said first struts being rigidly secured to and extending upwardly from said seat frame and forming a rearwardly facing abutment surface, and each of said second struts being rigidly secured to and extending forwardly from said back frame and forming a forwardly facing abutment surface, each of said rearwardly facing abutment surface flushly engaging one of said forwardly facing abutment surface when said back frame is in said engaged position, said frame assembly and struts being generally formed from hollow tubular component parts;

a recline assembly secured to said frame assembly, said recline assembly selectively positioning said back frame at a desired position relative to said seat frame;

a lap and shoulder restraint assembly fixedly secured to said frame assembly, said restraint assembly including a single continuous belt and a latch mechanism, said belt having a predetermined length and two ends, said latch mechanism being securely mounted to said seat frame and including a mating latch that is slidingly joined to said belt, said latch dividing said belt into a lap portion and a shoulder portion, said lap portion engaging and restraining the lap of the occupant and said shoulder portion engaging and restraining the upper torso of the occupant; and, wherein said vehicle seat complies with pull test requirements of Federal Motor Vehicle Safety Standard 571.207 Section 4.2(c) Oct. 1, 2001, and supports an upper torso load of 3,000 pounds applied to said shoulder portion of said restraint assembly and a seat mass load of 20 times the mass of the seat multiplied by 9.8 applied through a center of gravity of said seat, both of said loads being simultaneously held for a duration of ten seconds.

23. The vehicle seat and restraint assembly of claim 22, and wherein said seat frame and back frame include opposed side frame members, and each of said first struts includes a first elongated brace and a first abutment member, each of said first braces being rigidly joined to and angled about 10 degrees from its said side frame member and extending along a majority of its said side frame member, and each of said first abutment members being rigidly joined to and angled about 55 degrees from its said side frame member, each of said first struts forming a triangular truss with a rearwardly facing surface offset from said rear end of said seat frame a predetermined distance, and each of said second struts includes a second elongated brace and a second abutment member, said second brace being rigidly joined and angled about 10 degrees from said back frame, and said second abutment member being angled about 35 degrees from said back frame, each of said rigidly joined second brace, second abutment member and side frame member being joined by a stiffening plate.

* * * * *